United States Patent [19]

Baron et al.

[11] 4,445,540

[45] May 1, 1984

[54] SLEEVE-TYPE FLUID FLOW DIVERTER

[75] Inventors: Walter J. Baron; Laird C. Cleaver, both of Milwaukee, Wis.

[73] Assignee: Water Services of America, Inc., Milwaukee, Wis.

[21] Appl. No.: 315,290

[22] Filed: Oct. 27, 1981

[51] Int. Cl.³ .............................................. F17D 1/00
[52] U.S. Cl. .............................................. 137/625.43
[58] Field of Search ................................... 137/625.43

[56] References Cited

U.S. PATENT DOCUMENTS 3,194,267 7/1965 Lyon et al. ..................... 137/625.43
3,319,710 5/1967 Heeren et al. .
3,973,592 8/1976 Cleaver et al. .

FOREIGN PATENT DOCUMENTS 832819 2/1952 Fed. Rep. of Germany .

Primary Examiner—Martin P. Schwadron
Assistant Examiner—James R. Shay
Attorney, Agent, or Firm—Andrus, Sceales, Starke & Sawall

[57] ABSTRACT

A fluid flow diverter includes a housing and a rotatable sleeve mounted for rotation on an axle and spaced inwardly from the housing walls. The sleeve and housing include ports which are selectively positioned in registered or unregistered relationship, depending upon which of two operative positions the sleeve assumes. The sleeve forms a single internal chamber through which fluid always flows in the same direction in both operative positions of the sleeve. The space between the sleeve and housing also forms a single chamber through which fluid always flows in the same direction in both operative positions of the sleeve. The unidirectional fluid flow through the sleeve itself is opposite to the unidirectional fluid flow through the external chamber between the housing and sleeve. The supporting connection between the cylindrical sleeve and housing walls occurs adjacent the registered sleeve and housing ports by means of mating peripheral supporting surfaces. In either position of the sleeve, the unused or unregistered sleeve ports face the interior wall of the housing with their supporting surfaces spaced therefrom. A filler member is mounted to the housing interior wall adjacent the position of each unregistered sleeve supporting surface. In actual use of a diverter in connection with a tube type heat exchanger or similar process device, there will be a fluid pressure differential between the supply and return sides within the diverter itself, due to the pressure drop caused by the tube restrictions. The supply side will have a higher pressure than the return side. The result is that water from the supply side will tend to flow through the narrow gaps between the sleeve supporting surfaces and the housing supporting surfaces and/or the filler members in a direction from the supply or high pressure side toward the return or low pressure side. The direction of flow through the gaps will be the same for both rotary positions of the sleeve, due to the aforementioned unidirectional fluid flow. Any loose particles of corrosion products which may appear at the various gap interfaces will tend to be washed through to the other side and not get stuck.

24 Claims, 15 Drawing Figures

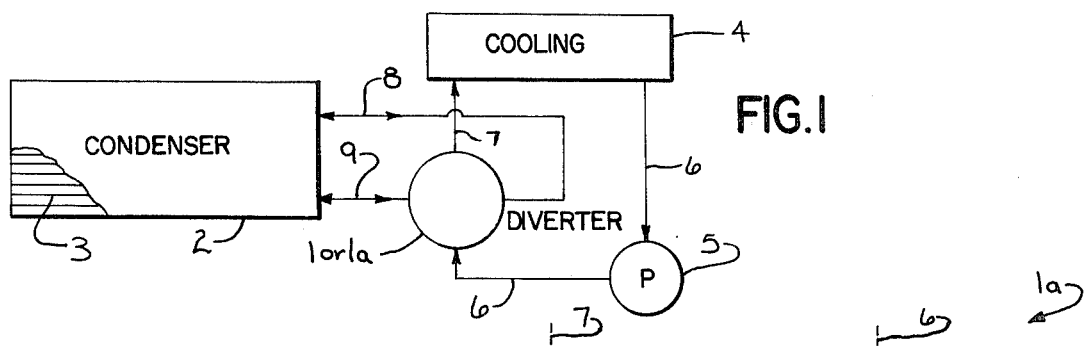
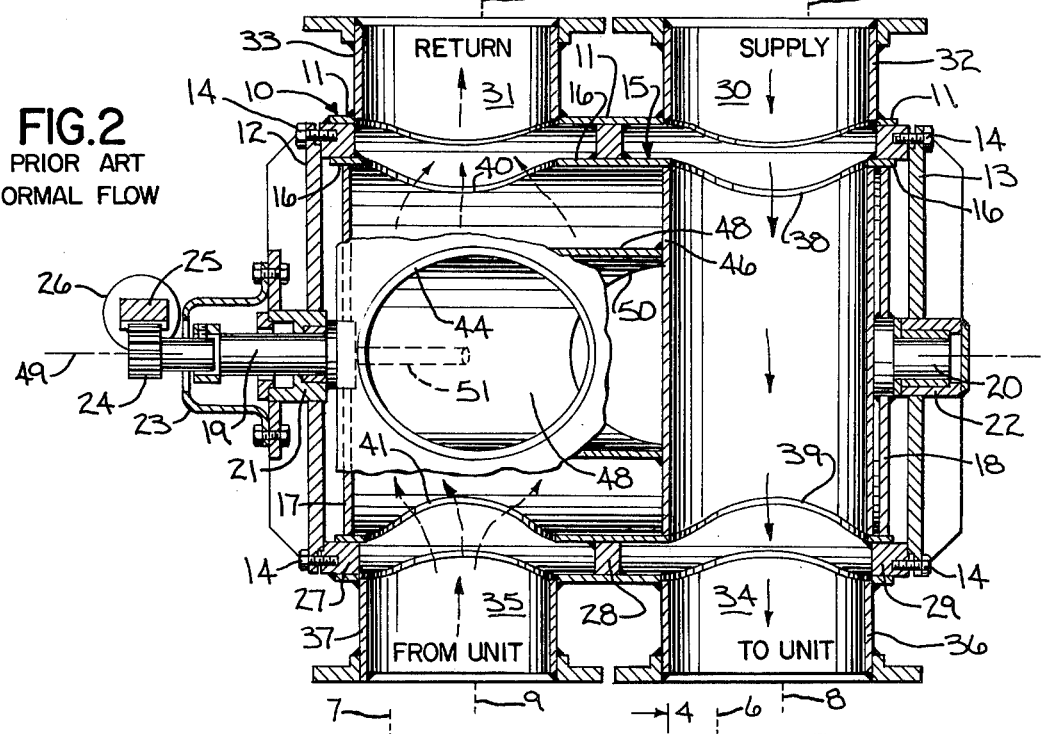
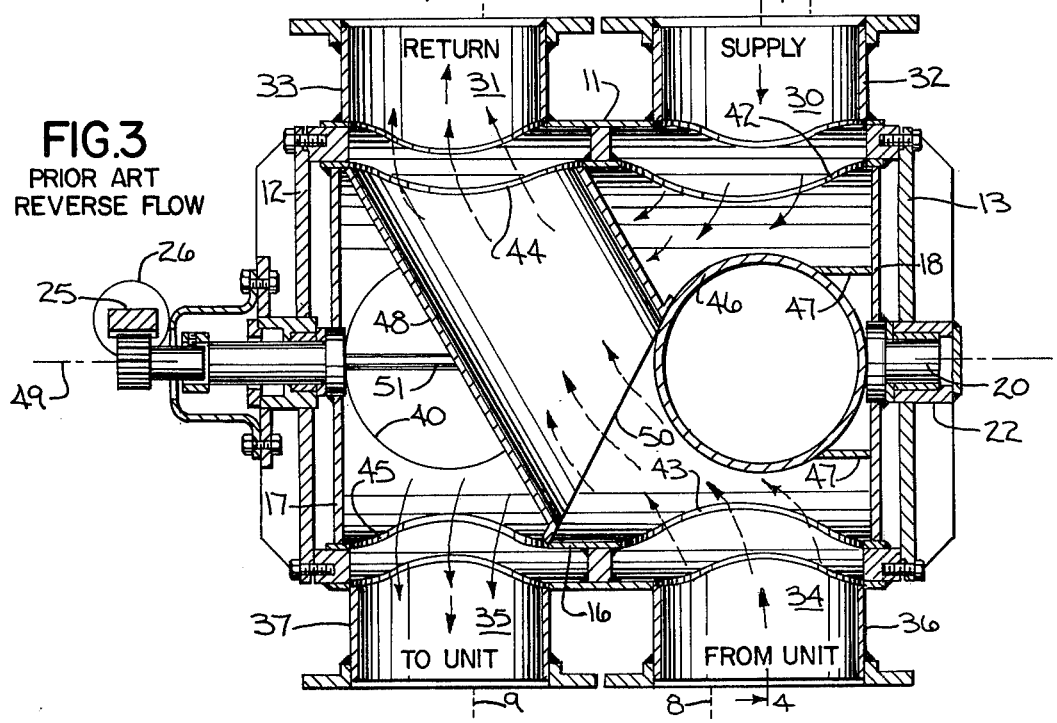

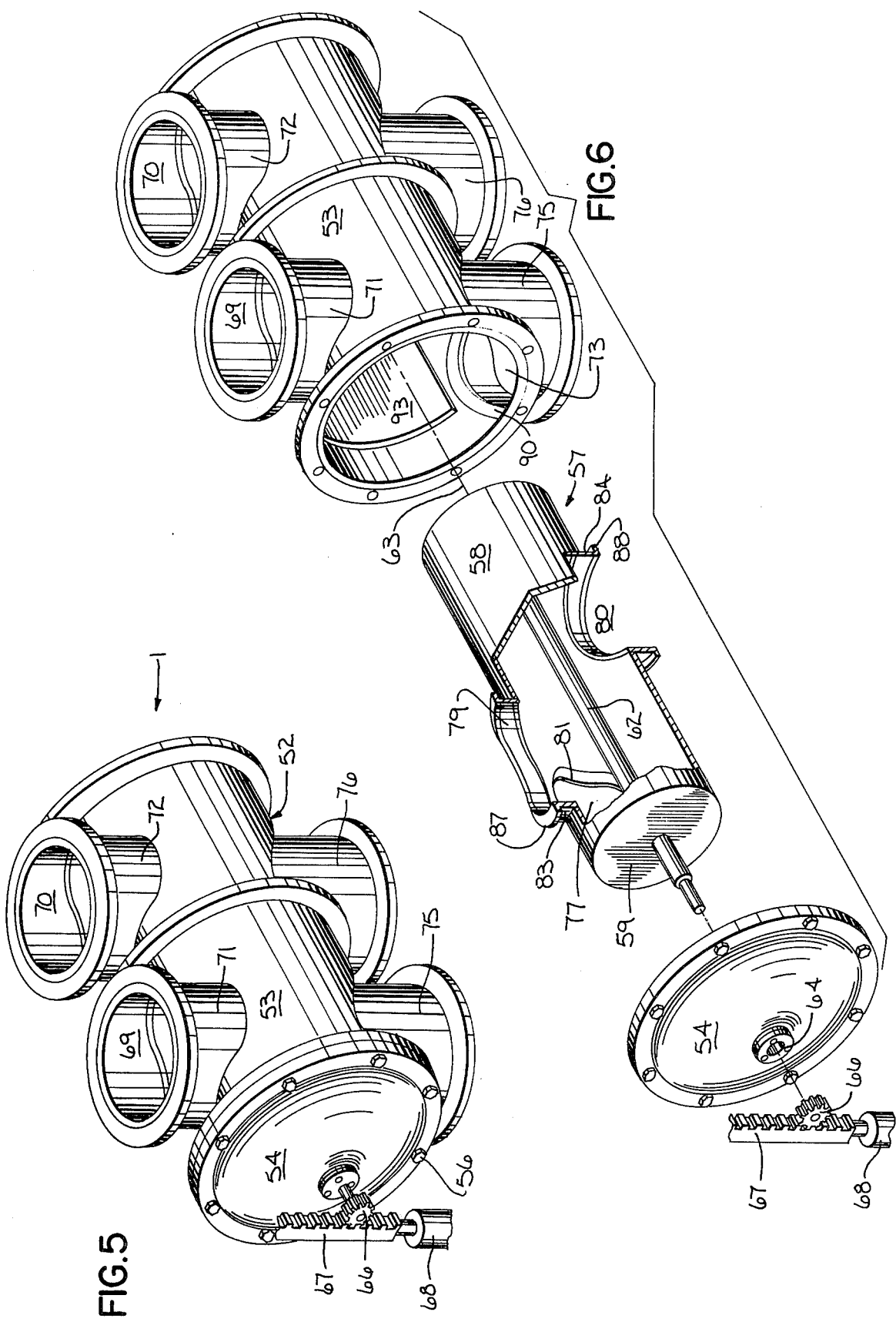

SLEEVE-TYPE FLUID FLOW DIVERTER

U.S. PRIOR ART OF INTEREST

| U.S. Pat. No. | Inventor | Issued |
| --- | --- | --- |
| 3,319,710 | Heeren et al. | May 16, 1967 |
| 3,973,592 | Cleaver et al. | Aug. 10, 1976 |

BACKGROUND AND SUMMARY OF THE INVENTION

This invention relates to a sleeve-type fluid flow diverter, particularly for use in the cleaning of tubing of heat exchangers.

It has previously been suggested that heat exchanger tubing may be internally cleaned by mounting brush-basket assemblies on the ends of the tubes, and then by flowing fluid first in one direction and then the other to cause the brushes to traverse the length of the tubes and then return to their original position. See the above-identified U.S. Pat. No. 3,319,710.

It has also previously been suggested as in the above-identified U.S. Pat. No. 3,973,592 to utilize a four-way valve for purposes of reversing fluid flow within the tubes to cause the cleaning brushes to move in both directions within the tubes.

It is also broadly known to utilize a sleeve-type diverter to reverse the fluid flow within the tubes. This known device incorporated a generally cylindrical sleeve rotatably mounted in an outer housing. The housing provided annular ring type support bearing surfaces for the ends and center portion of the sleeve and also included four ports for connection through conduits to a source of cooling fluid and to the heat exchanger. On one side of the sleeve axis, a first pair of housing ports for supply and return, were provided for connection to the source of cooling fluid. On the opposite side of the axis, and in line with the supply and return ports, a second pair of housing ports was provided, each of which could be selectively connected to either the inlet or outlet of the heat exchanger, depending on the rotary position of the sleeve.

The sleeve body of the prior diverter included a large plurality of ports adapted to selectively register with the housing ports. Connector conduits disposed within the sleeve and of a diameter at least as great as the housing and sleeve ports served to form a plurality of internal sleeve chambers and to connect the first and second housing ports. In each of the two rotary positions of the sleeve, fluid flowed from the housing supply port and either through or around one of the sleeve's internal conduits to one of the second pair of housing ports. At the same time, fluid flowed from the other of the second pair of housing ports and either through or around the other of the sleeve's internal conduits to the housing return port. Rotation of the sleeve 90° reversed the flow at the second pair of housing ports, although the flow at the supply and return housing ports remained the same.

In the above described known sleeve-type diverter, it was found that the large restriction within the sleeve, caused by the connector conduits, caused an undesirable pressure drop in the fluid flowing around a particular conduit. In addition, it was found that binding sometimes occurred between the annular support bearing surfaces and the sleeve wall, thus making it difficult to install or rotate the sleeve. Aside from considerations of manufacturing tolerances, this binding was believed to be at least partially due to corrosion and sticking of particles occurring at the continuously mating interfaces between the bearing surfaces and sleeve.

The present invention solves the aforementioned problems and is directed to a sleeve-type diverter which substantially reduces pressure drop as well as binding difficulties. It is also more economical to manufacture.

In accordance with one aspect of the invention, the rotatable sleeve is mounted for rotation on an axle means and is spaced inwardly from the housing walls. The sleeve forms a single internal chamber through which fluid always flows in the same direction in both operative positions of the sleeve. The space between the sleeve and housing also forms a single chamber through which fluid always flows in the same direction in both operative positions of the sleeve. The unidirectional fluid flow through the sleeve itself is opposite to the unidirectional fluid flow through the external chamber between the housing and sleeve. The only restriction to fluid flow within the sleeve is the sleeve axle means, which has a substantially smaller cross-sectional area than that of the sleeve and housing ports, thus reducing pressure drop to a minimum. Likewise, the length of the cross-sectional area between the inner sleeve and housing is much larger than the cross-sectional area of a connected port, thus contributing very little to pressure drop.

In accordance with another aspect of the invention, the supporting connection between the cylindrical sleeve and housing walls occurs adjacent the registered sleeve and housing ports by means of mating peripheral surfaces. The machining of the surfaces can be such as to provide for a substantially close fit. In addition, in either position of the sleeve, the unused or unregistered sleeve ports face the interior wall of the housing with their supporting surfaces spaced therefrom. A filler member is mounted to the housing interior wall adjacent the position of each unregistered sleeve supporting surface and is formed to also provide a close fit therewith. The total area of contact between the various surfaces is less than the contacting bearing surfaces of the prior known sleeve-type diverter, thus reducing binding due to tolerance problems.

In actual use of a diverter in connection with a tube type heat exchanger or similar process device, there will be a fluid pressure differential between the supply and return sides within the diverter itself, due to the pressure drop caused by the tube restrictions. The supply side will have a higher pressure than the return side. The result is that water from the supply side will tend to flow through the narrow gaps between the sleeve supporting surfaces and the housing supporting surfaces and/or the filler members in a direction from the supply or high pressure side toward the return or low pressure side. The direction of flow through the gaps will be the same for both rotary positions of the sleeve, due to the aforementioned unidirectional fluid flow. Any loose particles of corrosion products which may appear at the various gap interfaces will tend to be washed through to the other side and not get stuck. Freely exposed contact surfaces will also be continuously washed, whether the sleeve is in or between its operating positions. This also will reduce problems of binding.

BRIEF DESCRIPTION OF THE DRAWINGS

The accompanying drawings illustrate the best mode presently contemplated by the inventors for carrying out the invention.

In the drawings:

FIG. 1 is a schematic showing of a heat exchange system to which the fluid flow diverter of the present invention may be applied;

FIG. 2 is a central vertical section of a previously known sleeve-type fluid flow diverter, shown in normal flow position;

FIG. 3 is a view of the diverter of FIG. 2 in reverse flow position;

FIG. 5 is a perspective view of the fluid flow diverter of the present invention;

FIG. 6 is an exploded view of the diverter of FIG. 5 with the internal sleeve shown in reverse flow position;

DESCRIPTION OF THE PREFERRED EMBODIMENT

Figure 4:
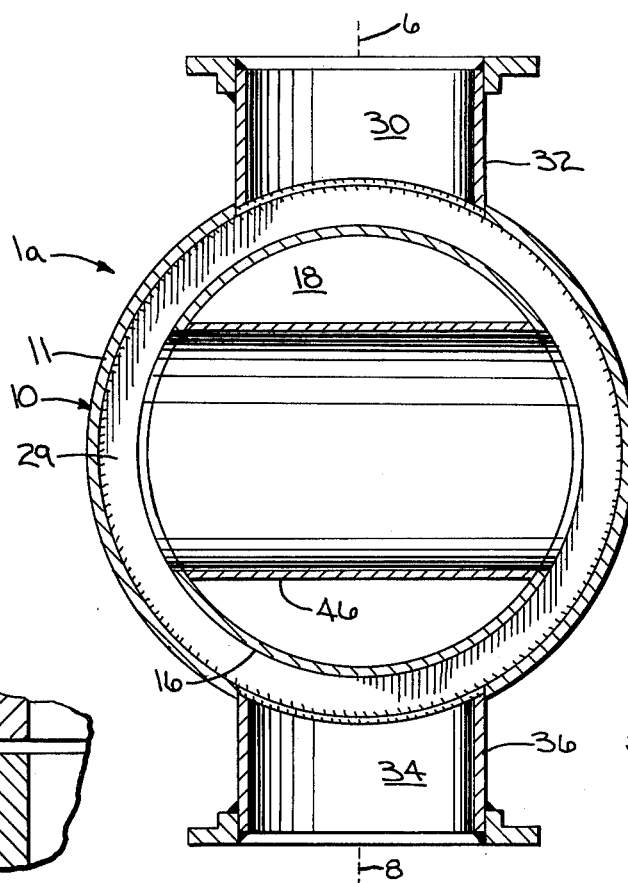
FIG. 4 is a transverse section taken on line 4—4 of FIG. 3.

The fluid flow diverter 1 of the invention is shown schematically in FIG. 1 and may be utilized in connection with a process device such as a heat exchange condenser 2 having a plurality of tubes 3 therein. Diverter 1 normally supplies cooling water from a fluid source 4 such as a lake or the like and flow thereof is continuously generated by a pump 5. The diverter is connected to pump 5 and source 4 through a suitable fluid supply line 6, and also to source 4 by a suitable return line 7. A pair of lines 8 and 9 connect diverter 1 to condenser 2 in the conventional manner. Diverter 1 is actuatable to reverse the flow in lines 8 and 9 so that tube cleaning brushes, not shown, can shuttle back and forth in condenser tubes 3 from time to time.

FIGS. 2-4 illustrate a previously known form of sleeve-type fluid flow diverter 1a, as heretofore discussed. Diverter 1a includes a housing 10 comprising a cylindrical wall 11 enclosed by end walls 12 and 13 which are secured thereto as by bolts 14. A sleeve 15 is disposed concentrically within housing 10 and comprises a cylindrical wall 16 enclosed by end caps 17 and 18. Sleeve 15 is adapted to be rotatable within housing 10 and for this purpose, stub shafts 19 and 20 extend axially outwardly from sleeve-end caps 17 and 18 and are received within bearings 21 and 22 on housing end walls 12 and 13. Shaft 19 extends beyond bearing 21, through a cover 23, and is connected to means for rotating the shaft and sleeve through a suitable arc, such as 90°. In the shown embodiment, this means comprises a pinion 24 on shaft 19 which meshes with a rack 25 which in turn is suitably reciprocated by a pneumatic cylinder 26 through any suitable well-known control mechanism, not shown.

The cylindrical wall 16 of sleeve 15 is supported by annular bearing rings 27, 28 and 29 which are secured to housing wall 11 as by welding. The inner faces of bearing rings 27-29 are engaged by wall 16 at the wall ends and middle, and normally permit sliding of wall 16 thereover during rotative repositioning of sleeve 15. As can be seen in FIGS. 2 and 3, the bearing rings separate the space between walls 11 and 16 into a pair of separate side-by-side chambers.

It should be noted that a relatively large area of contact exists between bearing rings 27-29 and sleeve wall 16.

The cylindrical wall 11 of housing 10 is provided with a pair of ports 30 and 31 which are upstream in the loop formed with source 4 and condenser 2 (see FIG. 1). Ports 30 and 31 are provided with flanged sleeves 32 and 33 which are connected through lines 6 and 7 to source 4, and always function as supply and return ports respectively. Similarly, wall 11 includes a pair of downstream diverter ports 34 and 35 having flanged sleeves 36 and 37 connected through lines 8 and 9 to condenser 2. As shown, the upstream and downstream port pairs are diametrically opposed.

Sleeve 15 is constructed to carry incoming fluid from supply port 30 to one of the downstream ports 34 or 35, and to carry return fluid from the other downstream port 34 or 35 back to return port 31. For this purpose, sleeve wall 16 is provided with eight ports 38-45 positioned on its surface as shown. Ports 38 and 39 are shown as diametrically opposed in a transverse plane and are sealingly joined by a flow pipe 46 which is also connected to sleeve end cap 18 by struts 47. A second flow pipe 48 connects at one end to port 44 and extends toward pipe 46 at an angle of approximately 45° to the axis of rotation 49 of sleeve 15, with its terminus 50 connected to pipe 48 and sleeve wall 16 so that it opens into port 43. Pipe 48 is connected to sleeve end cap 17 by a rod 51.

In the normal flow position shown in FIG. 2, supply fluid will flow from source 4 and line 6, through sleeve 32 and ports 30 and 38, through pipe 46 within sleeve 15, through ports 39 and 34, and hence through sleeve 36 and line 8 to condenser 2. Return fluid from the condenser will flow in through line 9, through sleeve 37 and ports 35 and 41, diametrically through the interior of sleeve 15 and around pipes 46 and 48, out through ports 40 and 31, and hence through sleeve 33 and line 7 and back to source 4.

In the reverse flow position shown in FIG. 3, supply fluid will flow from source 4 and line 6, diagonally through the interior of sleeve 15 and around pipes 46 and 48, out through ports 45 and 35, and hence through sleeve 37 and line 9 to condenser 2. Return fluid from the condenser will flow in through line 8, through sleeve 36 and ports 34 and 43, through sleeve 15 to pipe 48 and diagonally through the latter to ports 44 and 31, and hence through sleeve 33 and line 7 and back to source 4. The two flow paths form a generally X-shaped contour.

It should be noted that in both operating positions of sleeve 15, fluid is forced to flow around pipes 46 and 48 within the sleeve, said pipes being generally as large in diameter as the sleeve ports. Since the diameter of these ports is generally about equal to ½ the sleeve length, the pipes present a relatively large mass within the sleeve interior.

Turning now to the improved diverter 1 of the present invention, and referring to FIGS. 5-9, the diverter includes an enclosed housing 52 comprising an elongated longitudinal cylindrical wall 53 enclosed by end walls 54 and 55 which, unless integral therewith, are secured thereto in any suitable manner, such as by bolts 56. A sleeve 57 is disposed concentrically within housing 52 and comprises an elongated longitudinal cylindrical wall 58 enclosed by end caps 59 and 60 to form a single internal chamber 57a. The sleeve wall and end caps are spaced substantially inwardly from the housing walls, thus forming a single chamber 61 open from end to end. Sleeve 57 is adapted to be rotatable within housing 52, about an axial support means. In the present embodiment, this means comprises a shaft-like axle 62 coextensive with the diverter axis 63 and fixed to and extending through end caps 59 and 60. of sleeve 57. The ends of axle 62 are journalled in bearings 64 and 65 which are mounted to housing end walls 54 and 55 exteriorly of the sleeve. Axle 62 extends beyond bearing 64 and is connected to means for rotating the axle and sleeve through a suitable arc, such as 90°, between a pair of operative positions. This means may also comprise a pinion 66, rack 67 and a motive means such as a suitably actuatable pneumatic cylinder 68.

The cylindrical wall 53 of housing 52 is provided with a pair of axially spaced ports 69 and 70 which are upstream in the loop formed with source 4 and condenser 2. (See FIG. 1.) Ports 69 and 70 are provided with flanged sleeves 71 and 72 which are connected in the usual well known manner to lines 6 and 7, and hence to source 4. Ports 69 and 70 function as supply and return ports. Similarly, housing wall 53 includes a pair of axially spaced downstream ports 73 and 74 having flanged sleeves 75 and 76 connected through lines 8 and 9 to condenser 2.

While the in line upstream and downstream port pairs are shown as diametrically opposed, they need not necessarily be so positioned.

In the present embodiment, and in either position of sleeve 57, sleeve chamber 57a is constructed to carry incoming fluid from supply port 69 to one of the downstream ports 73 or 74, and chamber 61 is constructed to carry return fluid from the other downstream port 73 or 74 back to return port 70. For this purpose, sleeve wall 58 is provided with four ports 77-80. Ports 77, 78 and 79 form a trio of circumferentially spaced openings disposed generally diametrically in line with upstream supply port 69 and downstream port 73 of housing 52. Port 80 forms a single opening disposed generally transversely in line with upstream return port 70 and downstream port 74 of housing 52, and longitudinally spaced from the trio of ports.

Figure 7:
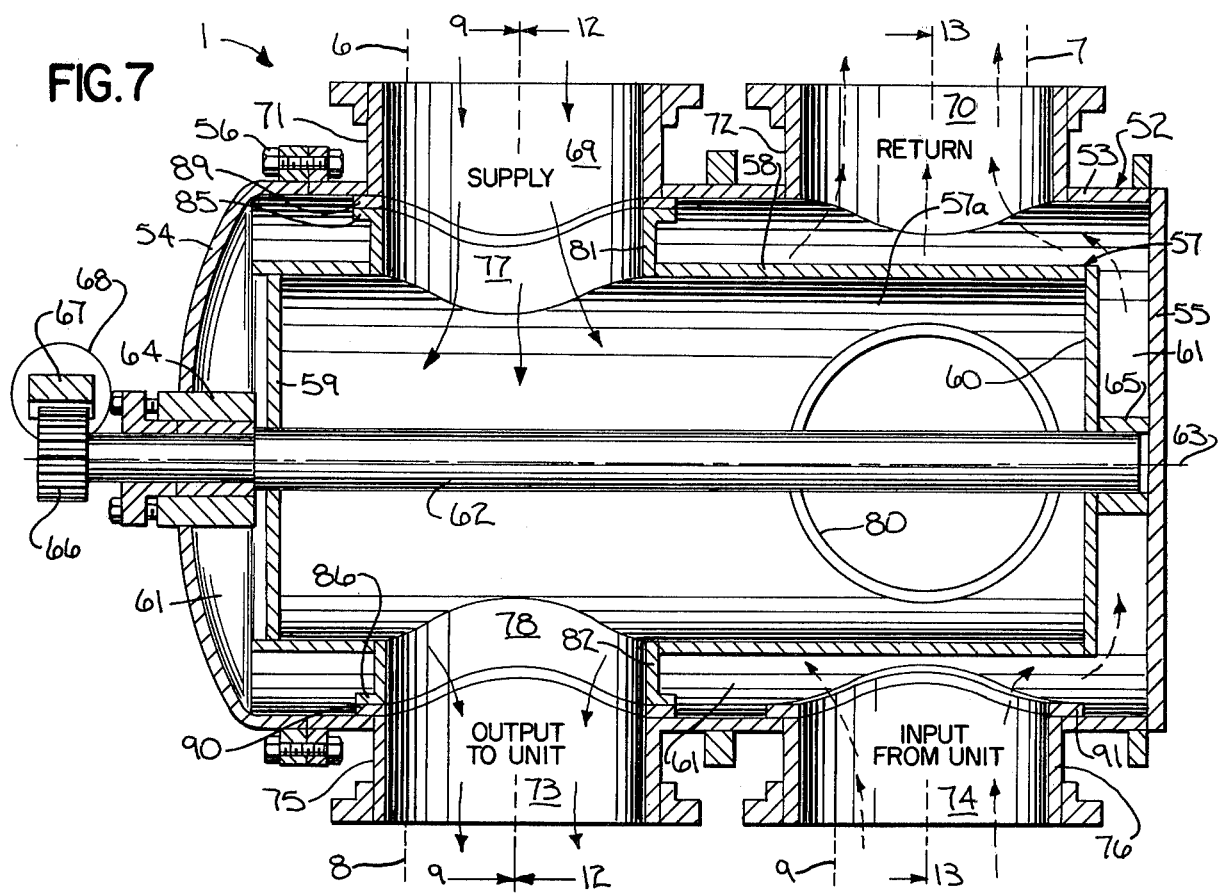
FIG. 7 is a central vertical section of the diverter, shown in normal flow position.
Figure 8:
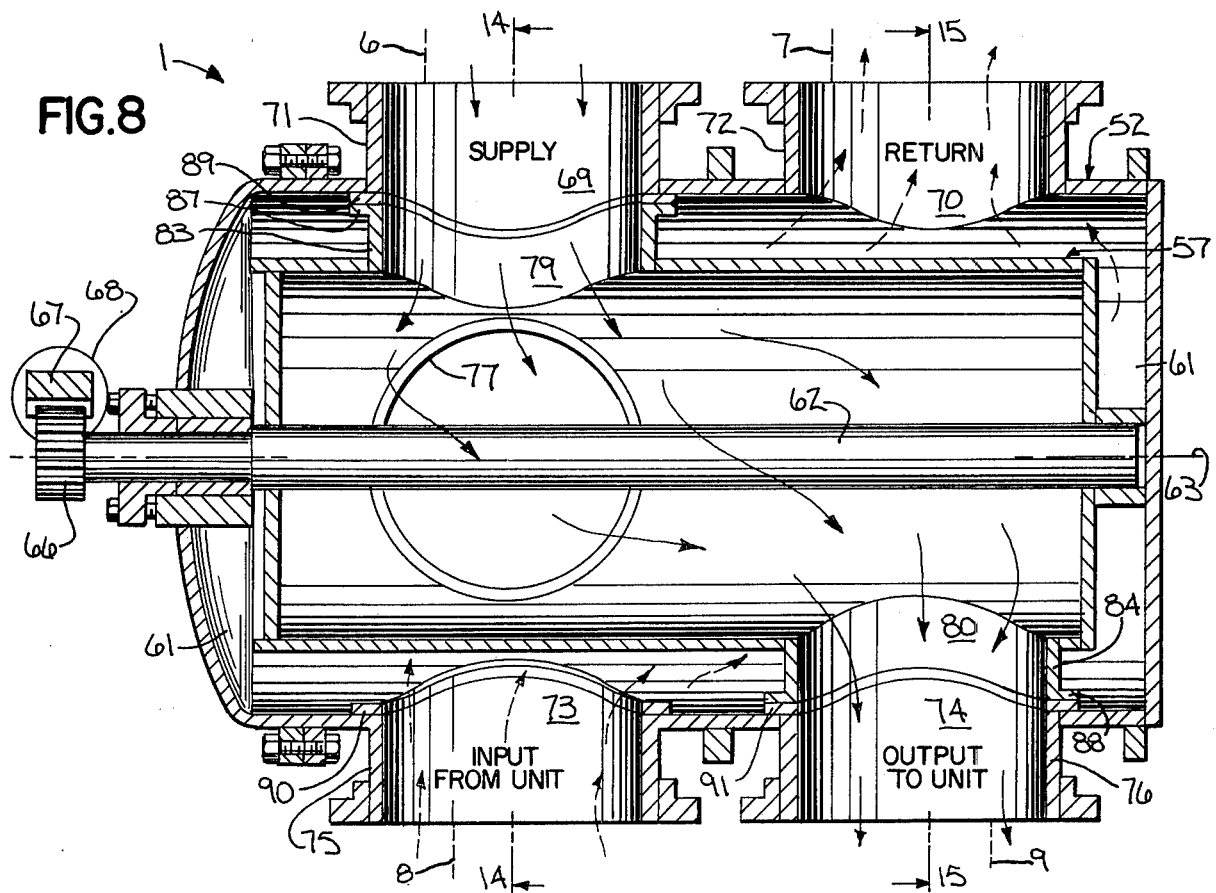
FIG. 8 is a view similar to FIG. 7 with the diverter in reverse flow position.
Figure 12:
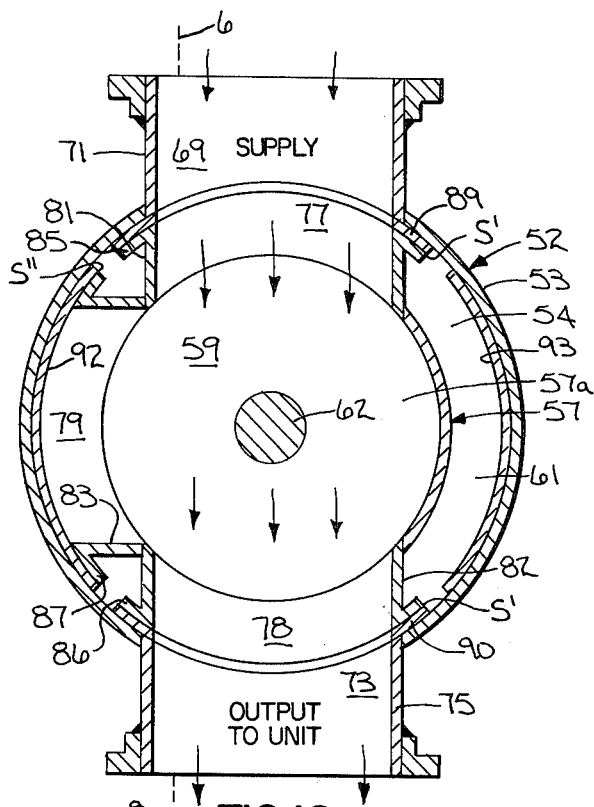
FIGS. 12-15 are vertical sections taken on the respective section lines in FIGS. 7 and 8.
Figure 13:
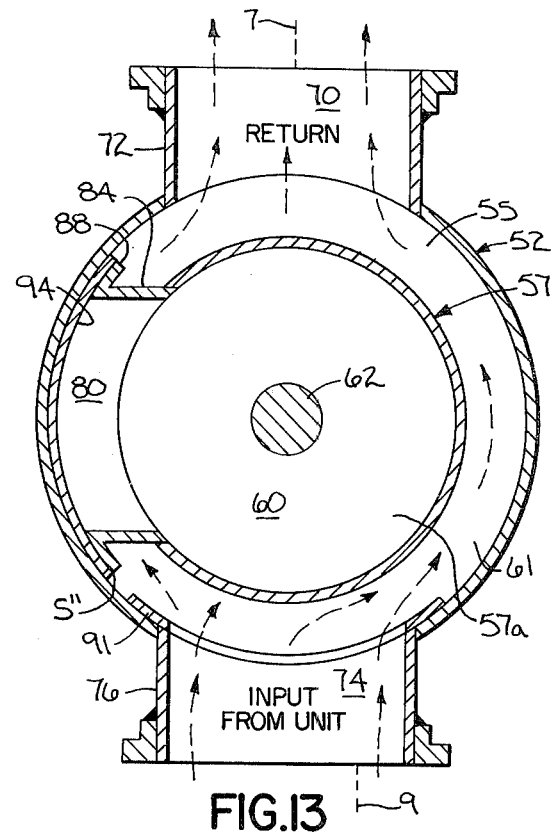

As best shown in FIGS. 7 and 8, axle 62 is substantially less in cross sectional area than the cross sectional area of any of the sleeve or housing ports.

Means are provided to support sleeve wall 58 and to generally isolate the interior of the sleeve from chamber 61 when the sleeve is in its two operative positions as shown in FIGS. 7 and 8. For this purpose, each sleeve port 77, 78, 79 and 80 is provided with a radially outwardly extending sleeve-like annular stub nozzle 81, 82, 83 and 84 respectively. Nozzles 81, 82, 83 and 84 function as connectors and are provided with peripheral flanges 85, 86, 87 and 88 respectively. In addition, one upstream housing port 69 is provided with a peripheral gasket 89, while both downstream housing ports 73 and 74 are also provided with respective peripheral gaskets 90 and 91. Gaskets 89-91 are disposed on the inner housing wall within chamber 61. No gasket is necessary for the other housing port 70, as will be seen.

Depending upon the operative position of sleeve 57, sleeve stub nozzle flanges 85-88 are adapted to selectively mate with housing port gaskets 89-91. For example, as shown in the normal flow sleeve position of FIG. 7, nozzle flange 85 mates with gasket 89 and nozzle flange 86 mates with gasket 90. In the reverse flow position of FIG. 8, nozzle flange 87 mates with gasket 89 while nozzle flange 88 mates with gasket 91.

Figure 10:
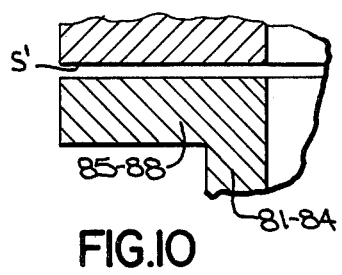
FIG. 10 is a fragmentary sectional view of a mating sleeve nozzle flange and housing port gasket, with the gap exaggerated.

The mating surfaces of flanges 85-88 and gaskets 89-91 are preferably precision machined to quite close tolerances commensurate with the need to install and rotate sleeve 57. The gap or space S' between mating elements should probably be no more than about 0.020 inch. See FIG. 10 with the space S' greatly exaggerated.

As best shown in FIGS. 7, 8, and 12-14, in any given operative sleeve position, at least one sleeve port is not in registry with a housing port and the unregistered sleeve port nozzle faces the housing wall 58. For example, in the normal flow position of FIGS. 7, 12 and 13, sleeve ports 79 and 80 and their respective nozzles 83 and 84 and flanges 87 and 88 face wall 58. In the reverse flow position of FIGS. 8, 14 and 15, sleeve port 77 and its nozzle 81 and flange 85 face wall 58.

To prevent major leakage between the unregistered sleeve ports and the interior of chamber 61, filler means are provided on the housing inner wall at the positions at which the unregistered sleeve ports are disposed from time to time. In the present embodiment, the filler means comprises a plurality of rectangular plates 92, 93 and 94 mounted to the interior of housing wall 58. Plates 92 and 93 are disposed in line with upstream and downstream housing ports 69 and 73 and are circumferentially spaced on opposite sides of axle 62. Plate 94 is disposed in line with the other housing ports 70 and 74 and is spaced longitudinally from plate 93 on the same side of axle 62.

Figure 11:
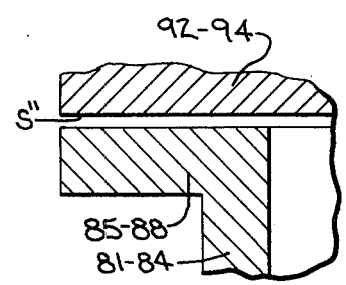
FIG. 11 is a fragmentary sectional view of a mating sleeve nozzle flange and filler plate, with the gap exaggerated.
Figure 9:
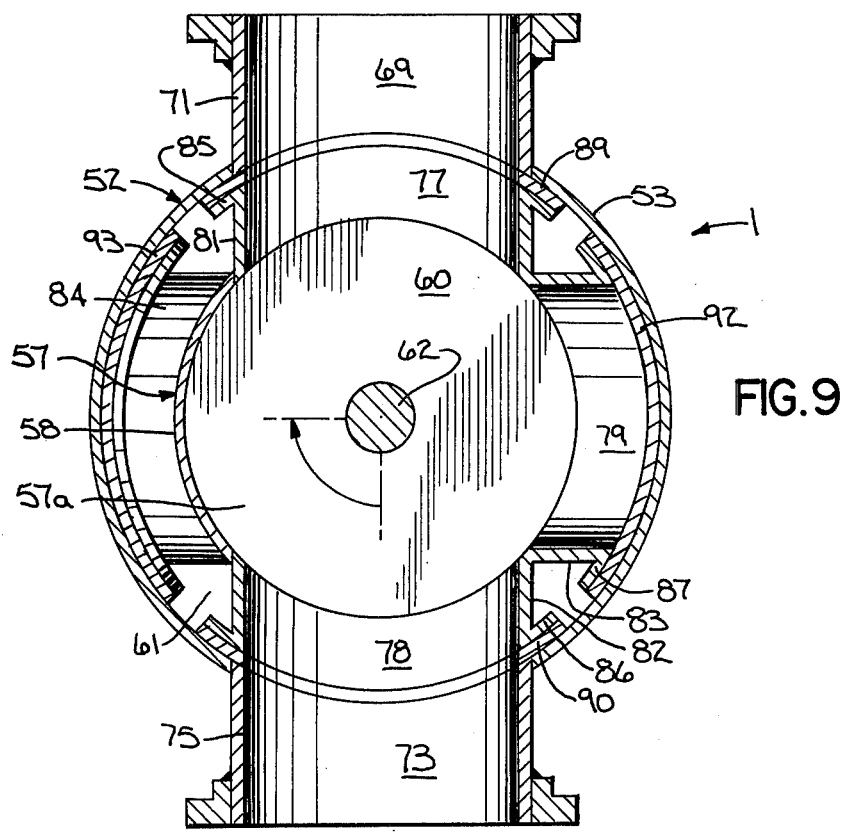
FIG. 9 is a transverse section taken on line 9—9 of FIG. 7.

The surfaces of plates 92-94 are also preferably precision machined so that they will mate closely with the respective unregistered nozzle flange surfaces. The gaps or spaces S″ between the mating surfaces are preferably about the same size as the gaps or spaces S′ between registering nozzle flanges and gaskets 89-91. See FIG. 11 with the space S″ greatly exaggerated.

Referring again to FIGS. 7, 12 and 13 which illustrate sleeve 57 in its normal flow position, ports 69 and 77 are in registry, as are ports 73 and 78, thus connecting sleeve chamber 57a with lines 6 and 8. Housing ports 70 and 74 open freely into chamber 61 and connect the latter with lines 7 and 9. Sleeve ports 79 and 80 are out of registry and their respective nozzle flanges 87 and 88 are in mating engagement with plates 92 and 94. Under the influence of pump 5, pressurized supply fluid will flow from source 4 and line 6, through sleeve chamber 57a and including around axle 62, and hence to line 8 to condenser 2. Return fluid from the condenser will flow through line 9 and into chamber 61 and around the periphery and ends of sleeve 57, and hence to line 7 and source 4. Fluid flow through sleeve ports 79 and 80 is basically blocked by plates 92 and 94.

Figure 14:
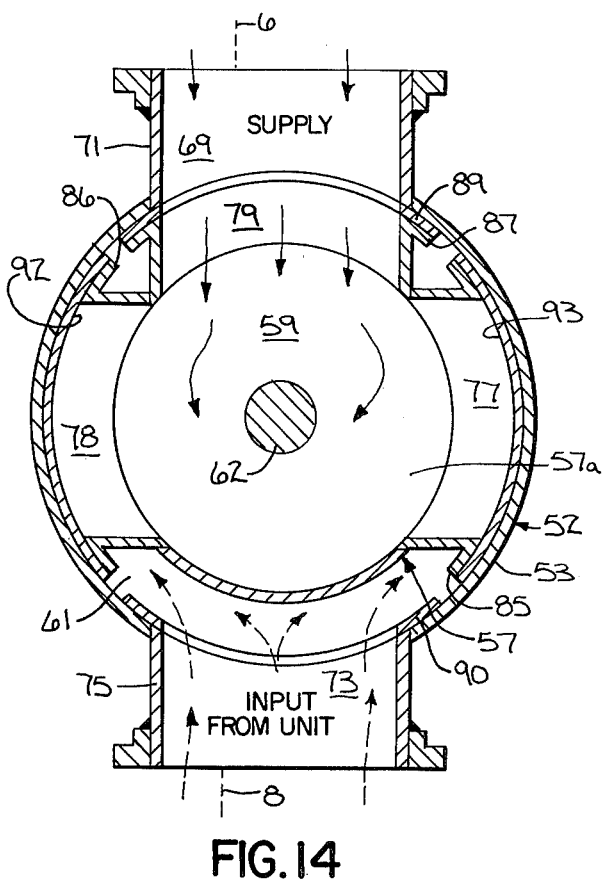
Figure 15:
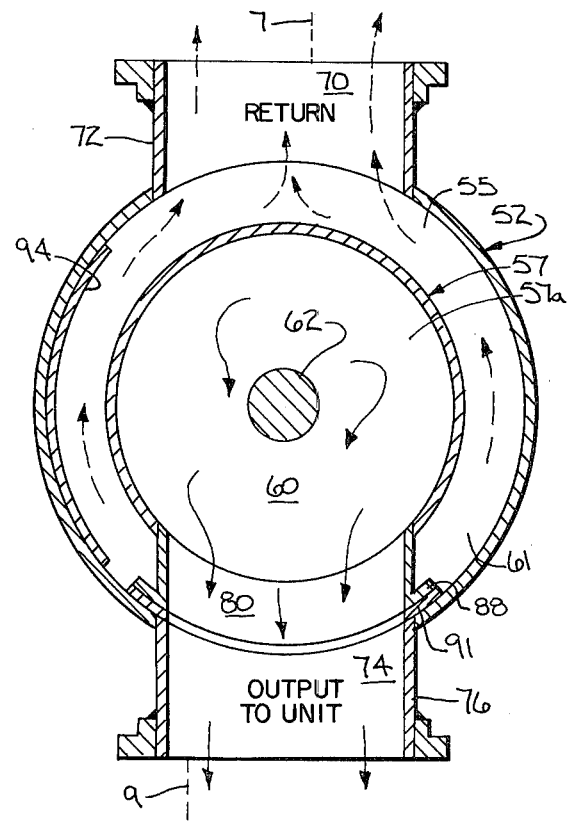

Referring to FIGS. 8, 14 and 15 which illustrate sleeve 57 in its rotated reverse flow position, ports 69 and 79 are in registry, as are ports 74 and 80, thus connecting sleeve chamber 57a with lines 6 and 9. Housing ports 70 and 73 open freely into chamber 61 and connect the latter with lines 7 and 8. Sleeve ports 77 and 78 are out of registry and their respective nozzle flanges 85 and 86 are in mating engagement with plates 93 and 92. Under the influence of pump 5, the flow of pressurized fluid through condenser 2 is now reversed. The supply fluid will flow from source 4 and line 6, and again through the sleeve chamber 57a and past axle 62, and hence to line 9 and to condenser 2. Return fluid from the condenser will flow through line 8 and into chamber 61 and around the periphery and ends of sleeve 57, and hence to line 7 and source 4. Fluid flow through sleeve ports 77 and 78 is basically blocked by plates 93 and 92.

The basic direction of fluid flow through sleeve chamber 57a in both operative sleeve positions thereof is the same. This unidirectional flow characteristic for both operative sleeve positions is also true for chamber 61. However, the flow direction through chamber 57a is generally opposite to the flow direction through chamber 61. In both instances, the body of sleeve 57 forms an isolating means which separates the two opposed fluid streams.

The sole restriction to fluid flow through sleeve 57 is axle 62 which, because of its previously discussed small cross-sectional area relative to the port areas, causes a negligible pressure drop in fluid flow through the sleeve. Although in the opposite flow direction the fluid encounters the large sleeve surface in chamber 61, the length of the cross-sectional area between inner sleeve 57 and housing 52 is much greater than the cross-sectional area of return port 70, so that here also pressure drop is kept to a minimum.

The present construction is such that the possibility of binding of sleeve 57 against rotation is substantially reduced. One method of reducing binding problems is to manufacture the parts forming the mating surfaces or corrosion resistant material such as a copper-nickel alloy. Furthermore, the walls forming chamber 61, to which the mating surfaces are exposed, can be epoxy coated to inhibit corrosion. Also, keeping the total areas of contacting surfaces at a minimum, which has been done in this case, will also help reduce binding.

In addition, means are provided to continuously flush or wash the contacting surfaces of sleeve nozzle flanges 85-88, gaskets 89-91 and plates 92-94 to thereby keep any possible products of corrosion from lodging on said surfaces and in spaces S' and S".

The present diverter device includes a supply chamber (sleeve chamber 57a in the present embodiment) and a return chamber (61 in the present embodiment). Due to the normal pressure drop occurring in the downstream process device (condenser 2 in the present embodiment) the fluid pressure in the supply chamber will be greater than that in the return chamber. This positive pressure will be applied to all restrictive spaces S' and S" to cause fluid to flow through the spaces from the supply or high pressure chamber to the return or low pressure chamber. As shown, the flow is from chamber 57a to chamber 61. The amount of flow will be small and not enough to disrupt the operation of the diverter, but will be sufficient to continuously wash the mating surfaces. Since the flow in each chamber is always in the same direction, the direction of washing flow through spaces S' and S" will never reverse.

Further continuous washing by the main body of flowing fluid occurs as to any filler member plate which is not utilized and is freely exposed when sleeve 57 is in an operative position. For example, note plate 93 in FIG. 12 and plate 94 in FIG. 15.

In addition, all of the nozzle flange, gasket and plate precision surfaces will be continuously washed by the main body of flowing fluid during intermittent shifting of sleeve 57 between operative positions. During this period, these surfaces will all be freely exposed to turbulent fluid as fluid is diverted within the unit.

The ultimate result is a cleansing of the relatively shiftable contact surfaces to enhance and assure sleeve rotation over long periods.

Although the present preferred embodiment places housing port 69 and sleeve chamber 57a on the supply side and chamber 61 and housing port 70 on the return side, the line connections to the diverter could be reversed if desired with a resultant reversal of internal function, without departing from the basic concepts of the invention.

Various modes of carrying out the invention are contemplated as being within the scope of the following claims particularly pointing out and distinctly claiming the subject matter which is regarded as the invention.

We claim:

1. A diverter valve for connection between a source of pressurized fluid and a process device, comprising, in combination:
    (a) an enclosing housing having a longitudinally extending generally cylindrical wall and end walls,
    (b) a sleeve disposed concentrically within said housing and with said sleeve having a longitudinally extending generally cylindrical wall and end caps,
    (c) means mounting said sleeve coaxially within said housing,
    (d) motive means for rotating said sleeve between a pair of operative normal and reverse fluid flow positions,
    (e) a pair of upstream supply and return ports disposed in said housing for connection to the fluid source,
    (f) a pair of downstream output and input ports disposed in said housing for connection to the process device,
    (g) multiple port means disposed in the said generally cylindrical wall of said sleeve for selectively connecting said housing supply and return ports to one or the other of said housing output and input ports depending upon the operative position of said sleeve,
    (h) said sleeve forming a single internal chamber connecting said multiple port means for flow of fluid through said internal chamber when at least some of said multiple port means register with one of said upstream and one of said downstream housing ports,
    (i) said housing and sleeve being spaced to form a single external chamber therebetween, and with said external chamber extending about said wall and end caps of said sleeve,
    (j) and said external chamber providing for flow of fluid therethrough between one of said upstream and one of downstream housing ports in both normal and reverse fluid flow operative positions of said sleeve.

2. The diverter valve of claim 1 wherein the general direction of fluid flow through each said internal and external chamber remains the same in both operative positions of said sleeve.

3. The diverter valve of claim 2 wherein the general direction of fluid flow through said internal chamber is the reverse of the general direction of fluid flow through said external chamber in both operative positions of said sleeve.

4. The diverter valve of claims 1, 2 or 3 wherein said sleeve wall and end caps form means to substantially isolate the fluid flow in each of said chambers from the fluid flow in the other of said chambers.

5. The diverter valve of claims 1, 2 or 3 wherein, in both operative positions of said sleeve:
  (a) said internal chamber is connected to the same one of said upstream supply and return housing ports,
  (b) and said external chamber is connected to the same other one of said upstream supply and return housing ports.

6. The diverter valve of claim 1 wherein:
  (a) said sleeve mounting means includes coaxially disposed shaft means rotatably connected to said housing end walls, and with said shaft means being fixedly connected to said sleeve end caps and extending into said internal chamber,
  (b) said shaft means providing the sole restriction to fluid flow through said internal chamber.

7. The diverter valve of claim 6 wherein the cross-sectional area of said shaft means is less than the area of any of said housing ports or said sleeve port means.

8. The diverter valve of claims 6 or 7 wherein the cross-sectional area of a said housing port is less than the length of the cross-sectional area of said external chamber.

9. The diverter valve of claim 1 wherein said multiple port means in said generally cylindrical wall of said sleeve comprises:
  (a) a trio of circumferentially spaced openings disposed generally diametrically in line with one of said upstream and one of said downstream housing ports,
  (b) and a further opening disposed generally diametrically in line with the other of said upstream and the other of said downstream housing ports, and with said further opening being longitudinally spaced from said trio of openings.

10. The diverter valve of claims 1 or 9 which includes:
  (a) radially extending connector means disposed between said sleeve and housing walls for selectively connecting said multiple port means with at least some of said upstream and downstream housing ports,
  (b) and connector sealing means disposed in said second chamber.

11. The diverter valve of claim 9 which includes:
  (a) an annular connector extending radially from each of said sleeve port openings toward said housing in said second chamber,
  (b) and a sealing member disposed peripherally about at least some of said housing ports for engagement by said connectors upon registry of a said opening with a said housing port.

12. The diverter valve of claim 11 wherein a said sealing member is disposed about only one of said pair of upstream housing ports.

13. The diverter valve of claim 12 wherein said upstream housing port having a sealing member disposed thereabout is transversely in line with said trio of sleeve openings.

14. The diverter valve of claim 12 wherein a said sealing member is disposed about each of said downstream housing ports.

15. The diverter valve of claim 11 wherein in each operative position of said sleeve, a plurality of said sleeve openings and their associated connectors are in unregistered position relative to a said housing port.

16. The diverter valve of claim 15 wherein:
  (a) in one operative position of said sleeve:
    (1) two of said trio of sleeve openings are registered with respective housing ports and the other of said trio of openings is in unregistered position,
    (2) and said further sleeve opening is in unregistered position,
  (b) and in the other operative position of said sleeve:
    (1) only one of said trio of sleeve openings is registered with a said housing port, with the other two of said trio of openings being in unregistered position,
    (2) and said further sleeve opening is registered with a said housing port.

17. The diverter valve of claim 15 which includes filler means disposed within said second chamber and disposed for engagement by said connectors when the openings associated with the latter are in said unregistered position.

18. The diverter valve of claim 17 wherein said filler means comprises a plurality of filler elements disposed on the inside of said longitudinally extending housing wall adjacent the unregistered positions of said openings.

19. The diverter valve of claim 18 wherein said connectors and said filler elements include precision surfaces adapted to matingly engage upon placing of an associated sleeve opening in unregistered position.

20. The diverter valve of claim 18 wherein said connectors and said peripheral sealing members include precision surfaces adapted to matingly engage upon placing of an associated sleeve opening in registered position with a said housing port.

21. The diverter valve of claim 18 wherein said filler elements and said peripheral sealing members include precision surfaces adapted to intermittently matingly engage with like precision surfaces on said connectors.

22. The diverter valve of claims 19, 20 or 21 wherein said precision surfaces, when matingly engaging, form fluid flow restrictions.

23. The diverter valve of claim 22 which, when connected between an upstream source of pressurized fluid and a downstream process device, has a pressure differential between said internal and external chambers, and wherein said flow restrictions are of sufficient width so that fluid continuously flushes through said restrictions unidirectionally in both operative positions of said sleeve.

24. The diverter valve of claim 22 which, when connected between an upstream source of pressurized fluid and a downstream process device, provides means for causing continuous flushing of freely exposed precision surfaces in all positions of said sleeve.

* * * * *

UNITED STATES PATENT AND TRADEMARK OFFICE
CERTIFICATE OF CORRECTION

PATENT NO. : 4,445,540
DATED : May 1, 1984
INVENTOR(S) : WALTER J. BARON ET AL

It is certified that error appears in the above-identified patent and that said Letters Patent is hereby corrected as shown below:

Claim 10, Col. 9, lines 49-50, Delete "second" and substitute therefor --external--

Claim 11, Col. 9, line 54, Delete "second" and substitute therefor --external--

Claim 17, Col. 10, line 25, Delete "second" and substitute therefor --external--

Signed and Sealed this

Thirtieth Day of October 1984

[SEAL]

Attest:

GERALD J. MOSSINGHOFF

Attesting Officer

Commissioner of Patents and Trademarks